United States Patent [19]

Raven et al.

[11] 4,172,761
[45] Oct. 30, 1979

[54] CELLULAR GRIDS WITH TWIN FERRULES

[75] Inventors: Leonard F. Raven, Holmes Chapel, Crewe; Joseph E. Naylor, Fulwood, Preston; Brian Crossley, Kirkham, Preston, all of England

[73] Assignee: British Nuclear Fuels Limited, Risley, Warrington, England

[21] Appl. No.: 862,856

[22] Filed: Dec. 21, 1977

[30] Foreign Application Priority Data

Jan. 12, 1977 [GB] United Kingdom ............... 1202/77

[51] Int. Cl.² ............................................. G21C 3/30
[52] U.S. Cl. ........................................ 176/76; 176/78
[58] Field of Search ............................... 176/76, 78

[56] References Cited

U.S. PATENT DOCUMENTS

| | | | |
|---|---|---|---|
| 3,231,476 | 1/1966 | Thome | 176/78 |
| 3,281,328 | 10/1966 | Hazel et al. | 176/76 X |
| 3,510,397 | 5/1970 | Zettervall | 176/78 |
| 3,804,354 | 4/1974 | Weiss | 176/76 X |
| 3,886,038 | 5/1975 | Raven | 176/78 |
| 3,966,550 | 6/1976 | Foulds et al. | 176/78 |
| 4,038,132 | 7/1977 | Pearson | 176/78 X |

*Primary Examiner*—Peter A. Nelson
*Attorney, Agent, or Firm*—Larson, Taylor and Hinds

[57] ABSTRACT

A ferrule type nuclear-reactor fuel grid has the two adjacent cells for the respective fuel rods from a single piece of metal strip. A dividing partition between the two cells may be a part of the single piece or a separate piece of strip. In either case the partition carries a resilient member extending into the cell opening to urge a fuel rod inserted therein against fixed stops pressed out of the ferrule wall. By this design a large number of fuel rods may be located in a compact array with a smaller amount of parasitic structural material in the grid.

5 Claims, 9 Drawing Figures

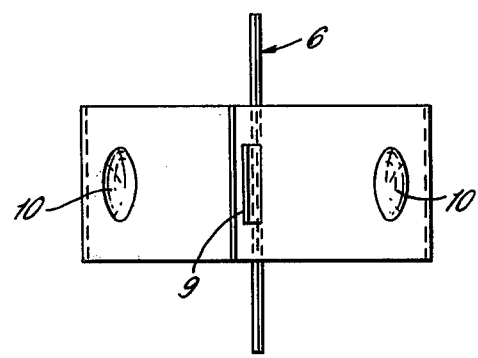
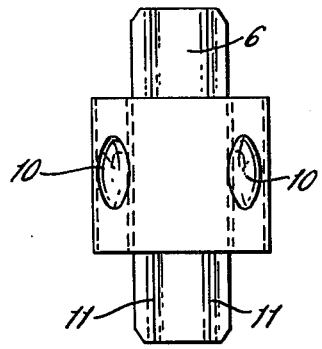
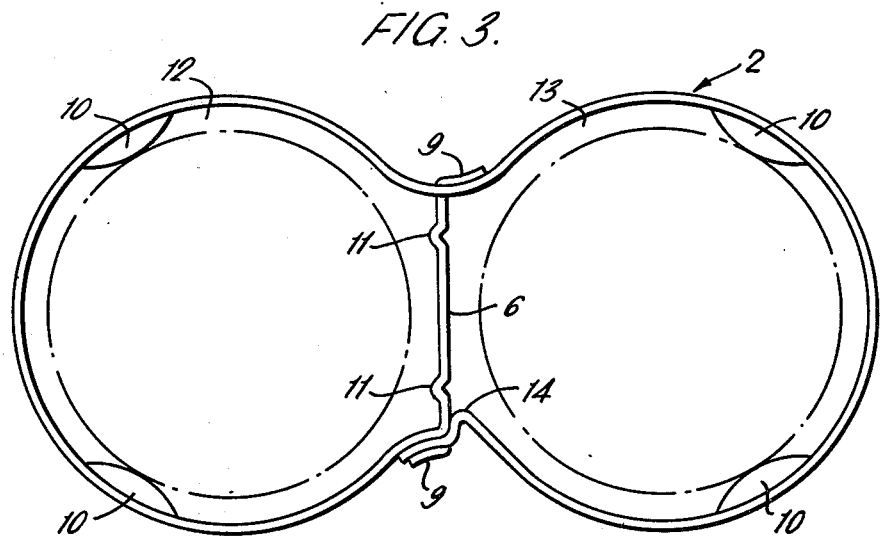

CELLULAR GRIDS WITH TWIN FERRULES

BACKGROUND OF THE INVENTION

This invention relates to cellular grids for positioning nuclear fuel rods, or the like in close proximity to one another. As will be known a nuclear fuel element comprises an assembly of nuclear fuel rods held together in a cluster so that it may be handled as a unit and, in order to ensure correct spacing between adjacent rods over their length, cellular grids are employed. Generally these grids are usually one of two kinds. Those of one kind are constructed from metal strips which run parallel to one another in two directions at right angles so as to form cells between intersecting strips of adjacent rows. Those of a second kind are constituted by a group of co-joined cylindrical or tubular ferrules each ferrule being adapted to receive a nuclear fuel rod and having received it, to hold it in its correct position. The present invention is concerned with grids of the second kind and aims to provide an improved construction of the ferrule type grid.

SUMMARY OF THE INVENTION

According to the invention a cellular grid structure of the kind employing ferrules to define respective openings for nuclear fuel rods comprises a plurality of tubular ferrules grouped within an encircling band, with at least some of the adjacent openings framed by twin ferrules formed from one piece of metal strip and a bridge piece dividing means dividing the interior of the twin ferrule into two similar openings. The twin ferrules are preferably brazed together at their points of contact and also to the encircling band. Any suitable means may be provided for positively locating fuel rods in the grid openings but it is preferred to use a modification of a method proven in conventional ferrule type grids and to this end a bowspring or leaf spring would be associated with the bridge piece for urging a fuel rod in contact with a pair of co-planar dimples formed in an opposite face of the ferrule. As will be known ferrule type grids for locating nuclear fuel are especially suitable for fuel assemblies in which it is desired to incorporate auxiliary coolant tubes or sparge pipes which, when connected to a source of auxiliary coolant, can play a part in supplementing the flow of main coolant which passes through the fuel element cluster in a direction parallel to the axis of the tubular ferrules. The auxiliary coolant may also replace the main coolant on occasion. The grid according to the present invention is especially adaptable to receive and locate sparge pipes of substantially the same outer diameter as the fuel rods. It is preferred to fit the part of the ferrule wall which is to locate a sparge pipe with an inner lining.

DESCRIPTION OF THE DRAWINGS

In order that the invention may be better understood a nuclear fuel rod positioning grid embodying the invention will now be described together with alternative forms of twin ferrules, with reference to the accompanying drawings in which FIG. 3 shows a plan of the one-piece construction of a single twin ferrule suitable for use in FIG. 1 grid, FIGS. 4 and 5 are side and end elevations of FIG. 3 to a smaller scale.

DESCRIPTION OF THE PREFERRED EMBODIMENTS

Figure 1:
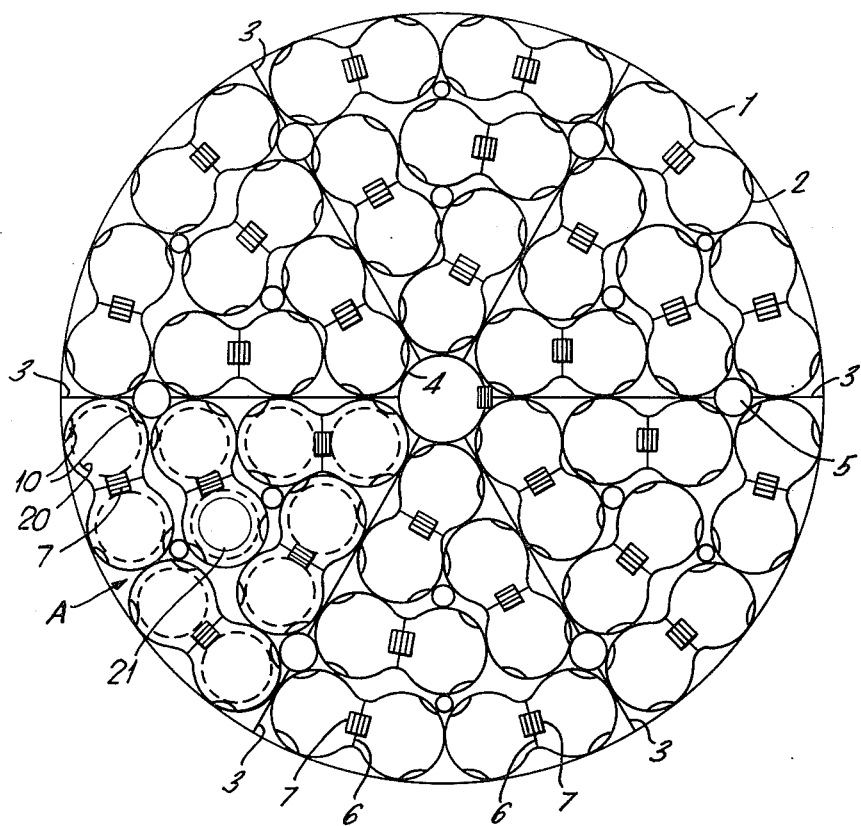
FIG. 1 is a plan view of a grid showing nuclear fuel rods in dotted outline positioned in one sector only.
Figure 2:
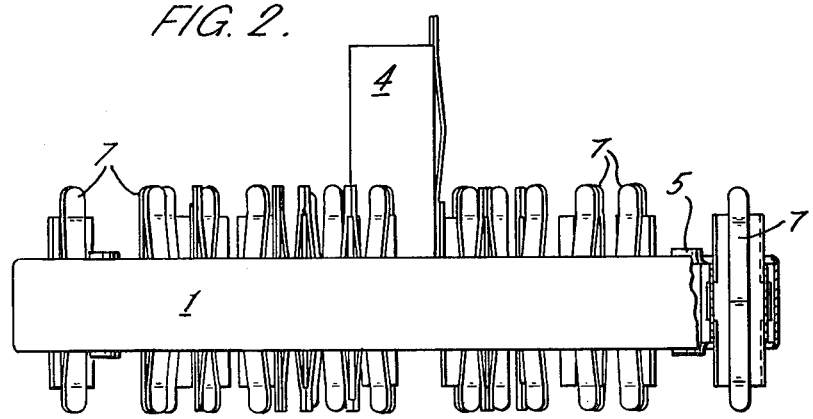
FIG. 2 is a side elevation of FIG. 1 without the fuel rods.

In FIGS. 1 and 2 a cellular grid structure comprises a plurality of tubular ferrules 2 grouped within an encircling band 1 with at least some of the adjacent openings or cells framed by twin ferrules formed from one piece of metal strip and a bridgepiece dividing means described below hereafter dividing the interior of each twin ferrule into two similar openings.

In FIGS. 1 and 2 the grid is seen to comprise an outer band 1 of metal strip which encompasses sixty cells for the reception of nuclear fuel rods and sparge pipes. The sixty cells are defined by thirty twin tubular ferrules 2 and five of these twin ferrules are assembled within each of the six sectors into which the area enclosed by the band 1 is divided. The division is effected by six radial webs 3 which are brazed to a central tubular ferrule 4 and the webs extend from the ferrule 4 to the outer band 1 where they are similarly brazed. Near their outer extremities the radial webs are formed with distance pieces shaped as small diameter spacers 5. The central ferrule 4 is adapted to receive a sparge pipe which also acts as a structural member. The twin tubular ferrules 2 are to frame two adjacent openings or cells and are formed from one piece of metal strip. Twin ferrule so formed from metal strip bounds two contiguous cells for the reception of adjacent fuel rods or a fuel rod and a sparge pipe of similar dimensions. The interior is divided by a bridgepiece dividing means in the form of a partition 6. The partition carries a double sided bow spring 7 which is a separate member. In the construction shown in FIGS. 3–5, the twin ferrule 2 is made from a strip metal blank which is in the main uniform width but has a portion near one end which is to constitute the partition 6 about three times the uniform width. The blank also has end tags 9. The blank is first deformed to exhibit four dimples 10 at positions predetermined so that when the strip is pressed to a shape to frame adjacent cells the dimples protrude into the cell interiors to form two rigid fuel rod-engaging stops. In addition two parallel ribs 11 are pressed into the partition-forming portions of the strip. The strip so prepared is pressed into the double cylindrical shape shown in FIG. 3 so as to frame adjacent cells 12, 13 separated by the partition 6 and secured in position by passing tags 9 through slots in the strip. The tags are then folded down flat. The partition 6 is retained in position by a re-entrant fold 14.

Figure 7:
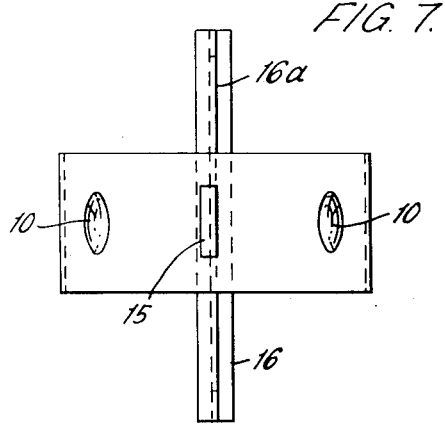
FIGS. 6, 7 and 8 are a plan view and side and end elevations respectively of a two piece construction of a twin ferrule.
Figure 8:
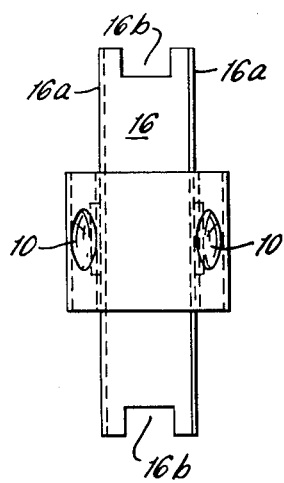
Figure 6:
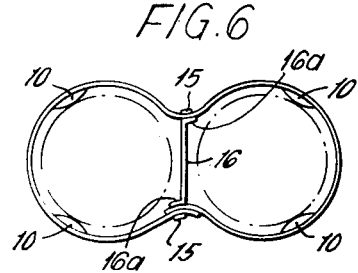

FIGS. 6–8 illustrate a similar twin cell ferrule in which the bridgepiece is not a part of the strip which frames the openings. Here one length of metal is of substantially uniform width and, having been formed with complementary tag and slot at each end and with dimples 10, is pressed into the shape which frames twin cylindrical cells. The ends overlap and are joined by tag and slot engagement at 15. A separate short length of strip 16 forms the partition between the cells. This shorter length has its longitudinal edges bent at right angles to form short flanges 16a and its other transverse edges cut with recesses 16b. The partition is inserted into the twin ferrule across the neck portion and fixed in position by brazing the mid-length portions into the neck portion of the twin ferrules.

Figure 9:
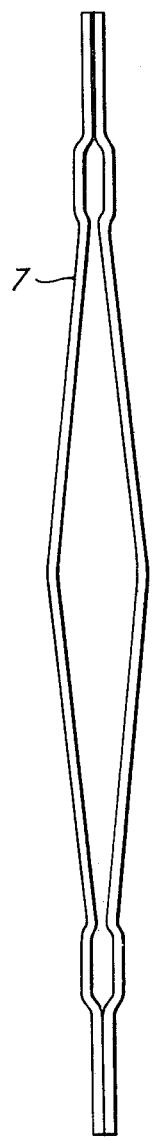
FIG. 9 shows a typical form of double sided bow spring similar to those used in FIGS. 1 and 2.

In both examples the partition carries a double sided bow spring 7. In the one piece construction FIGS. 3-5 the spring 7 is located between the ribs 11 of the partition whilst in the two piece construction it is located by the two recesses 16b in the end faces of the partitions. The double sided bow spring 7 is shown in FIG. 9 and comprises two lengths of Nimonic (RTM) type material which are oppositely bowed. The lengths are resistance spot welded together at one end only. After the grid has been fully brazed up with the twin ferrules joined together and to the other band 1 and to the web 3 where the parts are in contact with one another, the bow springs 7 are placed over the partition. The free ends of the springs are then joined together by resistance spot welding.

The presence of nuclear fuel rods 20 is indicated one sector A of the grid in FIG. 1 with the bow springs 7 pressing the fuel rods against the fixed stops 10. At a central position in each of the six sectors the ferrule opening is occupied by a sparge tube 21 only one of which is shown in FIG. 1. One end of each of the sparge tubes 21 is sealed where it protrudes through the end of the fuel assembly and the other end is available for connection to a source of auxiliary coolant in a substantially conventional manner.

We claim:

1. A cellular grid structure for a nuclear fuel element, comprising a plurality of tubular ferrules for defining openings for nuclear fuel rods, an encircling band within which the ferrules are grouped, at least some of the tubular ferrules being constituted by twin ferrule units, each said twin ferrule unit being constituted by a single bent metal strip, a bridge piece dividing means separating the interior of the twin ferrule unit into two similar openings for two adjacent fuel rods, and locating means for locating the nuclear fuel rods in the respective openings.

2. A grid structure according to claim 1, wherein said locating means includes a resilient member associated with each bridge piece dividing means and having a part projecting into each adjacent opening.

3. A grid structure according to claim 1 wherein each bridge piece dividing means is a partition integral with the metal strip which frames the adjacent openings.

4. A grid structure according to claim 1, wherein each bridge piece dividing means comprises a non-integral metal strip extending across the respective ferrule unit.

5. A grid structure according to claim 1, wherein each bridge piece dividing means has extremities which project beyond the plane of the grid and each extremity is shaped to retain a resilient member forming part of said locating means.

* * * * *